Oct. 16, 1945. A. S. MALLING 2,387,082
STRETCHER ACCOMODATION MEANS FOR VEHICLES OR THE LIKE
Filed June 15, 1944 2 Sheets-Sheet 2
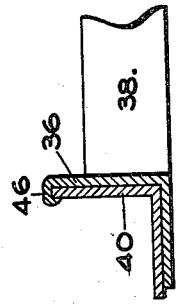
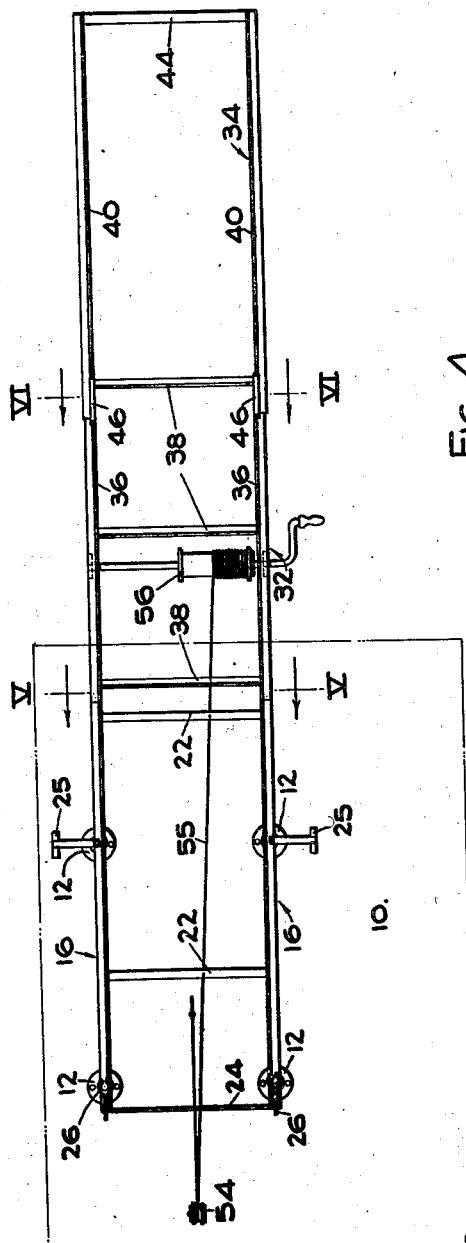
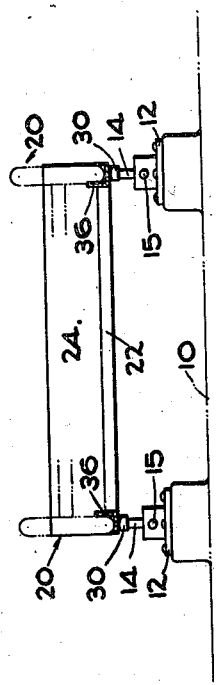
INVENTOR:
ALFRED S. MALLING
BY
Beau, Brooks, Buckley & Beau Patented Oct. 16, 1945

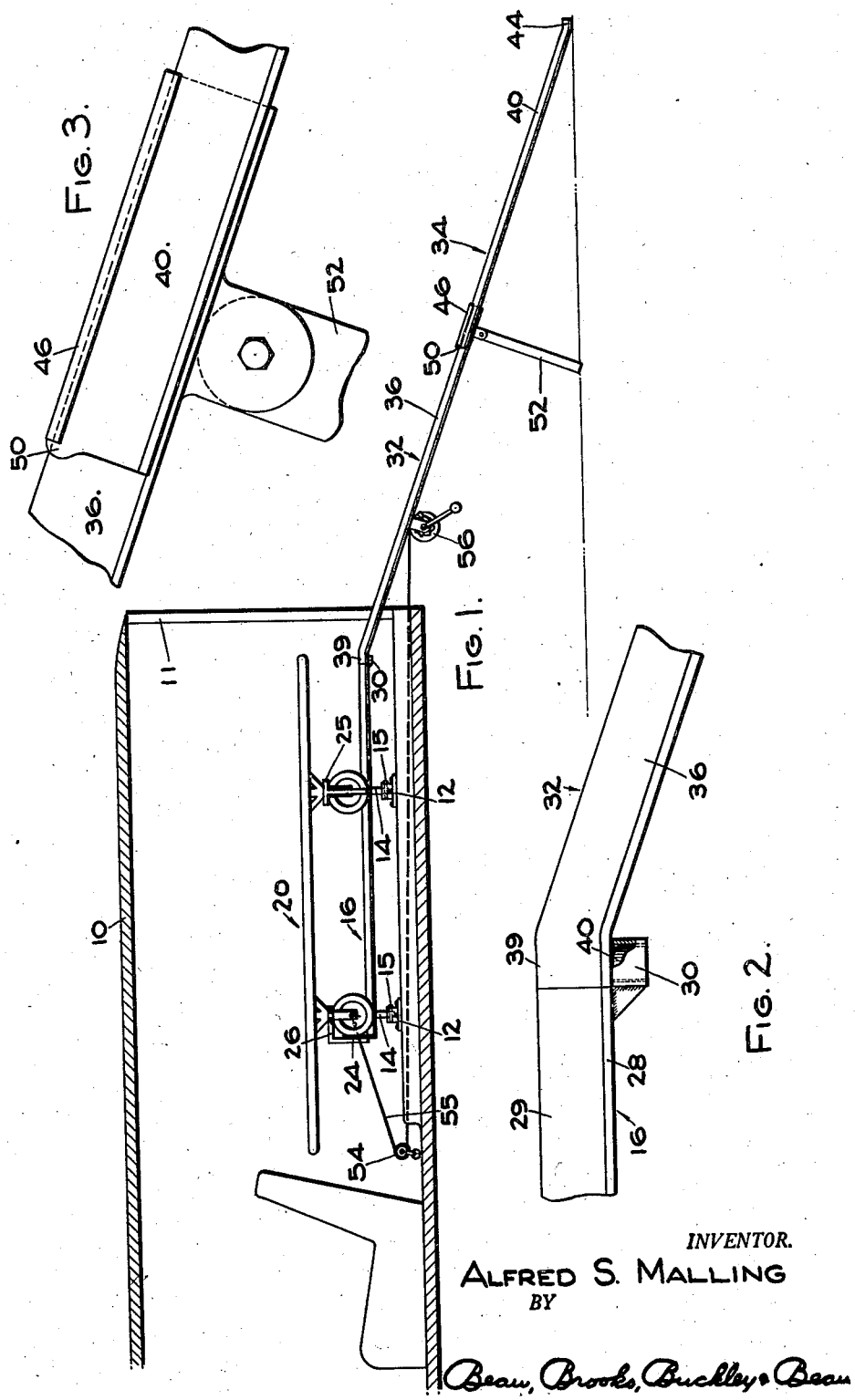

2,387,082

UNITED STATES PATENT OFFICE 2,387,082

STRETCHER ACCOMMODATION MEANS FOR VEHICLES OR THE LIKE

Alfred S. Malling, Hollywood, Calif.

Application June 15, 1944, Serial No. 540,520

3 Claims. (Cl. 214—85)

This invention relates to improvements in means for converting vehicles such as station wagons, delivery cars, trucks, or the like into ambulance vehicles such as are adapted to carry wheeled stretchers of the so-called Gurney type. More particularly, the present invention relates to a novel dismountable stretcher loading and carrying track device which is adapted to be quickly mounted and dismounted from any vehicle of the character aforesaid, for carrying a stretcher therein in improved manner and for facilitating loading and unloading of the stretcher to a ground level which is lower than the elevation of the floor of the vehicle.

One of the objects of the invention is to provide an improved stretcher carrying bracket and stretcher loading-unloading track device for the purposes aforesaid, the elements of which are so provided and arranged as to be combined into a particularly compact and light weight and rugged unit which is adapted to be extended for receiving a stretcher to be loaded or unloaded from the mounting vehicle in improved manner, and to be retracted for vehicle carrying purposes between stretcher dispensing points so as to avoid unnecessary interference with occupants of the vehicle.

Another object of the invention is to provide an improved stretcher elevating and supporting bracket unit which is adapted to be quickly mounted upon the bed of any conventional vehicle to convert the latter either temporarily or permanently into an ambulance; said elevating and supporting means being of structurally simplified form and embodying features providing simplification of operator use and adjustments thereof. Other objects and advantages of the invention will appear in the specification hereinafter.

In the drawings:

Fig. 1 is a fragmentary vertical longitudinal section through a vehicle body mounting a stretcher loading and carrying bracket device of the invention, showing a Gurney type stretcher in carrying position thereon;

Figs. 2 and 3 are fragmentary elevations, on enlarged scales, of bracket connection portions of the apparatus of Fig. 1;

Fig. 4 is a plan of the stretcher carrying apparatus of Fig. 1, with the stretcher loading portion thereof in extended condition; and Figs. 5 and 6 are sections taken along lines V and VI, respectively, of Fig. 4.

The drawings illustrate the invention in conjunction with a vehicle body which is designated generally at 10, and which may comprise any conventional station wagon or delivery wagon or truck type vehicle which preferably includes a closed body having a doorway 11 at a side or end portion thereof as shown. In any case, to prepare the vehicle for conversion to ambulance purposes it will be necessary first to remove only interfering objects which may be carried as standard equipment on the body bed; such as station wagon seats or delivery wagon accessories or the like. A plurality of foot devices as indicated at 12 may then be fastened to the floor of the vehicle body; and as shown herein, the foot devices may comprise simple flanged sockets such as are adapted to be fixed to the vehicle floor by means of wood screws or the like and to receive in their socket portions upstanding struts 14 which may be of standard pipe stock or the like. Cotter pins or set screws or the like may be employed as indicated at 15 to lock the struts in assembled relation upon the foot devices.

A pair of rails designated generally at 16—16 are arranged to be supported upon the upper ends of the struts 14 in parallel elevated position relative to the vehicle floor, whereby the rails 16—16 are adapted to support thereon the corresponding wheels of a Gurney type stretcher which is indicated generally at 20. The strut and rail members may be relatively braced as indicated at 22, and a stop device 24 is preferably carried at the forward ends of the rails 16—16 to prevent the stretcher from rolling off the front end of the stretcher support. Spring finger stop devices 25—25 are preferably hinged upon the rails 16—16 so as to be adjustable into and out of stretcher leg engaging positions for preventing unintended rolling of the stretcher rearwardly and off the supporting bracket; and another pair of forked spring finger devices 26—26 may be mounted to extend rigidly from the cross bar 24 to automatically clamp upon the end legs of the stretcher 20 when pushed into carrying poistion upon the rails 16—16. As shown in Figs. 2-5, each of the rails 16—16 may conveniently comprise standard angle section stock preferably formed of light weight metal to comprise in each case a track portion 28 and an upstanding flange 29 for guiding the wheels of the stretcher to remain on the track plates. At their rear ends the rail 16—16 carry vertically facing socket devices 30—30 which may be formed from short lengths of standard pipe stock welded or otherwise fixed to the corresponding ends of the rails, as shown in detail in Fig. 2.

The stretcher loading and unloading portion of the apparatus comprises an extensible-contractable track system which is adapted to be hung at its forward end upon the socket devices 30—30 to extend rearwardly and downwardly therefrom into bearing contact against the ground behind the vehicle 10, as shown in Fig. 1. The loading-unloading unit comprises a pair of track sections which are designated generally 32—34. The forward track section 32 comprises a pair of rails 36—36 which may be of sectional forms identical to those of the rails 16—16. Cross braces 38 dispose the rails 36—36 in fixed parallel relation to register at their front ends with the rear ends of the rails 16—16 to provide a continuation of the trackway of the stretcher supporting device when in assembled relation thereon. For this purpose the rails 36—36 are each downwardly bent at their upper ends, as indicated at 39—39, and have welded or otherwise attached thereto downwardly depending boss members 40—40 which are adapted to slip-fit into the socket portions 30—30 of the rails 16—16, while the upper ends of the track plate portions of the rails 36—36 rest upon the upper ends of the socket devices 30—30. Thus, it will be appreciated that when the upper ends of the rails 36—36 are hung upon the socket devices 30—30, the rails 36—36 will provide an extended trackway in smooth continuation of the trackway provided by the rails 16—16, and that the loading-unloading unit may be readily disconnected at the socket connection point by simply lifting the loading-unloading track unit out of socket-engaging position.

The loading track unit 34 similarly comprises a pair of rail devices 40—40 of angle sectional form which are cross braced to be fixed in parallel relation at their lower ends by means of a plate 44. The rails 40—40 are disposed to rest upon the rails 36—36 in overlapping relation thereon and the rails 36—36 are formed with flanges 46—46 at their lower ends which overhang and slidably embrace the rail members 40—40 so as to hold the rail sections 32—34 in free sliding telescopic connected relation. The flanges 46—46 may, of course, be of any necessary length and construction so as to firmly maintain the rails 36—40 in telescopic supported relation.

Hence, it will be understood that the rear track section 34 comprising the rails 40—40 is freely extensible or retractable relative to the track section 32 comprising the rails 36—36, so that the track unit may be extended to provide a slightly inclined ramp for stretcher-loading and unloading purposes as shown in Fig. 1, while being also adapted to be telescopically retracted and collapsed into compact form so as to be adapted to be stowed within the interior of the vehicle and away from positions of possible interference with the occupants thereof when not being used for stretcher-loading or unloading purposes. Stop devices as indicated at 50—50 are preferably employed to extend from the front ends of the rails 40—40 for interfering engagement with the flanges 46—46 upon telescopic extensions of the stretcher loading-unloading unit, whereby to limit such extension to safe degrees and to prevent accidental disassembly thereof. Also, a supplemental brace leg 52 will be preferably hinged upon the lower end of each of the rails 36—36 so as to be adapted to be lowered into ramp-bracing positions as shown in Figs. 1-3 to reinforce the ramp track against bending.

As shown in Fig. 1, a pulley 54 will be preferably mounted upon the floor of the vehicle ahead of the stretcher rail structure for carrying a pull cable 55, one end of which is adapted to be hooked upon the stretcher as shown and the other end of which is adapted to be reeled upon a windlass 56 mounted upon the rail structure. Hence, a single ambulance attendant may with utmost facility connect the cable to a stretcher to be loaded or unloaded and control its movement up or down the rail structure, as the case may be, without assistance.

Thus, it will be appreciated that the stretcher supporting and loading and unloading apparatus of the invention is adapted to be fabricated with utmost facility from readily available materials and through employment of simple manufacturing processes to provide a simple and rugged structural unit which is adapted to be adjusted and manipulated by a single operator, for example, with ease and to enable the operator to load or unload a patient-bearing stretcher from the vehicle and to assemble and disassemble the apparatus in improved manner. Preferably, the parts of the movable portions of the apparatus will be constructed of extremely light weight metal, such as aluminum alloy, to further facilitate ease of handling thereof.

It will be appreciated that although only one form of the invention has been shown and described in detail it will be apparent to those skilled in the art that the invention is not so limited and that various changes may be made therein without departing from the spirit of the invention or the scope of the appended claims.

I claim:

1. An apparatus for converting a conventional vehicle into a stretcher-bearing ambulance, said apparatus being adapted to be temporarily connected to the floor of the vehicle and comprising a plurality of socket members adapted to be detachably mounted upon the floor of the vehicle, strut members extending vertically from said socket members, a pair of parallel rails carried by said strut members in parallel elevated position above the floor of the vehicle, said rails being adapted to support thereon a wheeled stretcher and each having mounted at the rear end thereof a socket device, a stretcher loading and unloading device comprising a pair of telescopically connected track devices carrying at one end thereof a pair of boss members adapted to slip-fit into said socket members for detachably connecting said loading-unloading device to said stretcher supporting device, one of said telescopically connected track devices being disposed to underlie the other thereof and having formed thereon flange means overlying and slidably embracing the other of said track sections to maintain said track sections in telescopic connected relation, and stop means carried by said track devices to limit telescopic movements thereof and to prevent accidental disassembly thereof.

2. Apparatus for converting a conventional vehicle into a stretcher-bearing ambulance and adapted to be temporarily connected to the floor of the vehicle, a plurality of socket members associated with the floor of the vehicle, strut members extending vertically from said socket members, a pair of parallel rails carried by said strut members in parallel elevated position above the floor of the vehicle, said rails being adapted to support thereon a wheeled stretcher and each having mounted at the rear end thereof a socket device, a stretcher loading and unloading device comprising a pair of telescopically connected track devices carrying at one end thereof a pair of boss members adapted to engage in said socket members for detachably connecting said loading-unloading device to said stretcher supporting device, one of said telescopically connected track devices being disposed to underlie the other thereof and having formed thereon flange means overlying and slidably embracing the other of said track section to maintain said track sections in telescopic connected relation, and stop means carried by said track devices to limit telescopic movements thereof and to prevent accidental disassembly thereof.

3. Apparatus for converting a conventional vehicle into a stretcher-bearing ambulance and adapted to be temporarily connected to the floor of the vehicle, a plurality of socket members associated with the floor of the vehicle, strut members extending vertically from said socket members, a pair of parallel rails carried by said strut members in parallel elevated position above the floor of the vehicle, said rails being adapted to support thereon a wheeled stretcher and each having mounted at the rear end thereof a socket device, a stretcher loading and unloading device comprising a pair of telescopically connected track devices carrying at one end thereof a pair of boss members adapted to engage in said socket members for detachably connecting said loading-unloading device to said stretcher supporting device, one of said telescopically connected track devices being disposed to underlie the other thereof and having formed thereon flange means overlying and slidably embracing the other of said track sections to maintain said track sections in telescopic connected relation, stop means carried by said track devices to limit telescopic movements thereof and to prevent accidental disassembly thereof, and a strut pivoted to said underlying track device at the portion which embraces the other track device for movement into depending ground engaging position to give medial support to the track sections.

ALFRED S. MALLING.